United States Patent [19]
Iino

[11] 4,230,220
[45] Oct. 28, 1980

[54] VERTICAL BULK-CONVEYING APPARATUS AND BULK DELIVERING SYSTEM UTILIZING THE CHARACTERISTICS THEREOF

[75] Inventor: Fujio Iino, Tokyo, Japan

[73] Assignee: Kabushiki Kaisha Mitsu Miike Seisakusho, Tokyo, Japan

[21] Appl. No.: 922,790

[22] Filed: Jul. 7, 1978

[30] Foreign Application Priority Data

Jul. 26, 1977 [JP] Japan .................................. 52-88811
Jan. 24, 1978 [JP] Japan .................................. 53-5797

[51] Int. Cl.³ ...................... B65G 15/14; B65G 63/00
[52] U.S. Cl. .................................. 198/509; 198/604; 198/626; 414/139; 414/144
[58] Field of Search .............. 198/509, 604, 605, 626, 198/627, 628, 638; 214/14, 15 D, 15 E; 414/198, 139, 144, 145

[56] References Cited

U.S. PATENT DOCUMENTS

| | | | |
|---|---|---|---|
| 1,597,393 | 8/1926 | Sinden | 198/638 X |
| 2,939,570 | 6/1960 | Dykeman | 214/14 X |
| 3,349,892 | 10/1967 | Barre | 198/509 |
| 3,982,626 | 9/1976 | Mehta | 198/626 |

FOREIGN PATENT DOCUMENTS 1120361 12/1961 Fed. Rep. of Germany ........... 198/626

*Primary Examiner*—Jeffrey V. Nase
*Attorney, Agent, or Firm*—Oldham, Oldham, Hudak & Weber

[57] ABSTRACT

A novel apparatus for vertically conveying bulk materials is provided which includes a vertical belt conveyor comprised of two endless conveyor belts guided to travel upwardly along a substantially vertical plane in a face-to-face overlapping relation to each other and a highspeed bulk projector for packing bulk material into between the opposing faces of the two conveyor belts, utilizing the momentum of the bulk material per se. The two conveyor belts are guided at the bottom so as to turn round in directions opposite to each other in substantially symmetrical fashion and bulk material is projected rapidly under the effect of centrifugal force to the bottom belt junction where the two conveyor belts come to join each other. The conveying apparatus, with its highspeed bulk projector combined with a rotary bucket wheel type bulk feeder, forms a vertical bulk delivering apparatus which is compact and highly versatile. In combination with an appropriate movable support frame, the delivering apparatus is advantageously usable as a delivering unit of a vertical bulk delivering system for a bulk storing yard or for unloading bulk cargo which is operable in the yard or cargo hold to deliver the bulk cargo vertically upward with particular efficiency.

2 Claims, 15 Drawing Figures

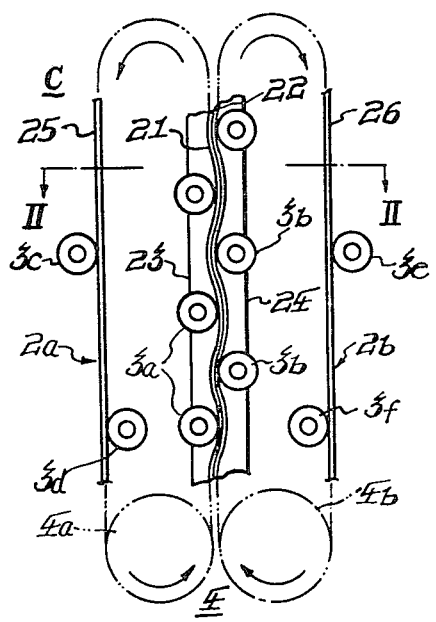
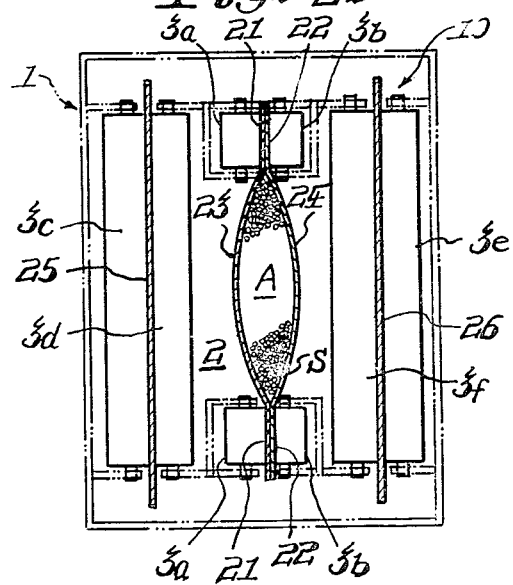

VERTICAL BULK-CONVEYING APPARATUS AND BULK DELIVERING SYSTEM UTILIZING THE CHARACTERISTICS THEREOF

BACKGROUND OF THE INVENTION

1. Field of the Invention

The present invention relates generally to apparatus for conveying bulk materials such as mined, nonpacked coal, or ore or nonpacked cereal grain vertically upward in a continuous fashion and more particularly to vertical bulk conveyors of the type including conveying means in the form of two endless conveyor belts arranged in face-to-face overlapping relation to each other for holding bulk material therebetween and an improved bulk feeder combined with such conveying means, and relates also to bulk delivering apparatus utilizing such vertical bulk conveyors.

2. Description of the Prior Art

For the conveying to a higher level of bulk materials, such as coal piled in a coal yard and ore or grain material placed in the holds of a cargo vessel, a vertical conveyor has recently been proposed which includes two conveyor belts arranged to travel in face-to-face overlapping relation to each other upwardly in a substantially vertical direction while holding bulk material between the overlapping belt faces for continuous vertical transportation of the bulk material.

The vertical conveyor is highly excellent as a machine for conveying bulk materials to higher levels in that it does not necessitate any unduly large ground space for installation and is capable of continuous conveying operation with high efficiency. With the vertical conveyor, however, it has previously been unavoidable that its conveyor belts are subjected in operation to more or less strains on account of the means used to feed bulk material to be conveyed between the two conveyor belts. Specifically, in the bottom, bulk feed region of the vertical conveyor, one of the two conveyor belts is guided to travel in a substantially horizontal path so as to be fed with bulk material thereon and, passing under the bottom turning end of the other conveyor belt, comes into overlapping relation therewith so that the bulk material is held between the opposing surfaces of the two conveyor belts, which proceed thereafter upwardly at the same speed. With this arrangement, however, in the region where the first conveyor belt passes around the bottom turning end portion of the second conveyor belt, which proceeds around the periphery of a bottom guide pulley provided therefor, the two conveyor belts must proceed at the same angular velocity through an angle of approximately 90 degrees around the same guide pulley with their opposite side edges laid over each other the guide pulley. Because of this, the first conveyor belt is unduly stretched during its passage around the guide pulley and substantial reduction in service life of such belt results.

SUMMARY OF THE INVENTION

The present invention has for its primary object the provision of an improved vertical conveyor of the general kind described which is designed to overcome the difficulties previously met as described above and is capable of serving the purpose of delivering bulk materials stored in large quantities vertically upward with efficiency.

A more specific object of the present invention is to provide a vertical conveyor of the kind described which has an extended service life, including two conveyor belts guided substantially in symmetrical relation to each other.

Another object of the present invention is to provide an improved bulk feeder for use with a vertical conveyor of the kind described which enables the two conveyor belts of the latter to be guided in a symmetrical relation to each other while reducing the plan area required for the feeding of bulkmaterial to the conveyor and is thus applicable to a vertical bulk-delivering apparatus for delivering bulk materials stored in piles with increased efficiency.

A further object of the present invention is to provide a vertical bulk-delivering apparatus which is capable of scooping up bulk materials efficiently, for example, from a storing yard in which coal or the like is stored deep or from the holds of a cargo vessel in which coal, cereal grain or the like is held in bulk, and delivering the scooped material in a vertical direction.

To attain these and other objects, the present invention is primarily featured by a novel belt arrangement for a vertical conveyor in which the two conveyor belts are guided at the bottom end to turn around in directions opposite to each other in substantially symmetrical relation, bulk material to be conveyed being projected at high speed to the belt junction, where the two conveyor belts meet each other, so as to be loaded therebetween in a positive fashion.

As bulk loading means, any form of highspeed bulk projector of the type which principally utilizes centrifugal force may conveniently be employed.

Suck bulk projector can be made extremely small in size so as to be conveniently attached to the bottom, bulk feed region of a vertical conveyor while enabling the bulk receiving end thereof to be arranged in the rotary drum of a scooper unit of the well-known rotary bucket-wheel type thereby to form a continuous vertical bulk-delivering apparatus. Further, according to the present invention, it is contemplated to combine such continuous vertical delivering apparatus with a variety of conveyor mechanisms in order to realize a delivering system suited to the delivering of coal, ore or the like bulk material stored deep in a storing place or one advantageously usable in delivering bulk materials from narrow storing places.

The above and other objects, features and advantages of the present invention will become apparent from the following detailed description when taken in conjunction with the accompanying drawings, which illustrate a few preferred embodiments of the invention.

BRIEF DESCRIPTION OF THE DRAWINGS

In the drawings:

FIG. 1 is a fragmentary diagrammatic side elevational view illustrating the principles of a vertical conveyor usable in the present invention;

FIG. 2 is a cross-sectional plan view of the vertical conveyor, taken along the line II—II in FIG. 1;

DESCRIPTION OF THE PREFERRED EMBODIMENTS

Figure 3:
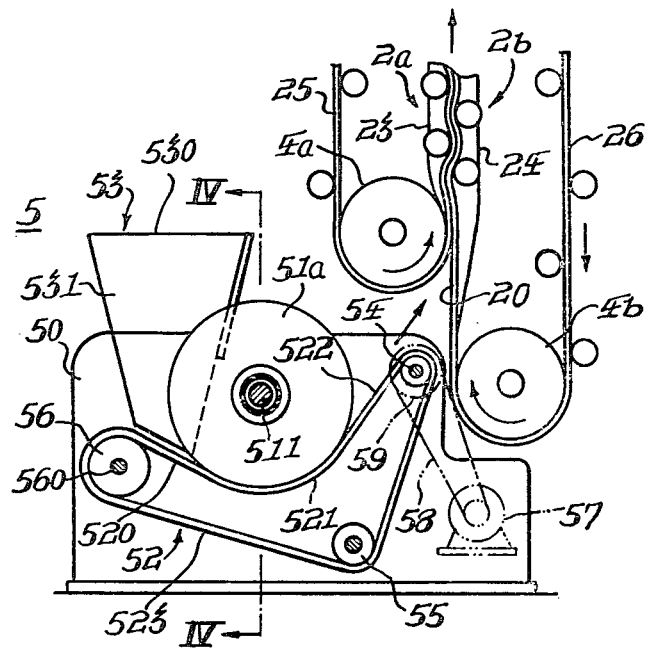
FIG. 3 is a fragmentary side elevation, partly in section, taken along the line III—III in FIG. 4 and illustrating one preferred form of bulk receiving structure of a vertical conveyor embodying the present invention with the front side frame of the bulk projector removed.

Referring first to FIGS. 1 and 2, which illustrate the principles of a vertical conveyor usable in the present invention, reference numeral 2 generally indicates the vertical conveyor, which consists essentially of two endless conveyor belts generally indicated by reference numerals 2a and 2b, respectively, and two sets of guide rollers 3 (3a, 3c, 3d; 3b, 3e, 3f) provided for the respective conveyor belts 2a and 2b. The vertical conveyor 2 is arranged in the interior space of an appropriate casing frame 1 which extends vertically and on which the two sets of guide rollers 3 are supported.

The two endless conveyor belts 2a and 2b are arranged to proceed in face-to-face overlapping relation to each other substantially along the center line of the vertical space 10 defined in the casing frame 1. The edges 21 and 22 of the two conveyor belts overlapping each other on each side thereof are held pressed against each other by two sets of side guide rollers, 3a and 3b, which are arranged at regular intervals on the back sides of the respective belt edges 21-22. As clearly seen in FIG. 1, the guide rollers 3a in one set are staggered vertically with respect to those 3b in the other set so that the belt edges 21 and 22 are more or less forced into the space between each pair of two adjacent guide rollers in one set by the adjacent one of the guide rollers in the other set. With this arrangement, it will be noted that a bulk holding space A of flattened tubular shape is formed between the medial portions 23-24 of the overlapping sections of conveyor belts 2a and 2b.

In operation, the overlapping conveyor sections travel upwardly at the same speed under the drive of a pair of driving pulleys (not shown), which are arranged at the top end of the conveyor line, and bulk material S is conveyed upwardly in a substantially vertical direction in a state held in the bulk holding space A progressively defined by the two conveyor belts 2a and 2b.

If desired, the opposite side edges 21-22 of the two conveyor belts 2a and 2b may be provided thereon with an interlocking structure, for example, of the labyrinth type, in order to positively seal the bulk material between the overlapping conveyor belts. It is to be noted, however, that the bulk holding space A defined between the medial portions 23-24 of the two overlapping conveyor belts can be held firmly sealed without use of any special formation on the belt edges, as shown in FIG. 2, by properly selecting the spacing of side guide rollers 3a and 3b in each set as long as the conveyor belts have an appropriate degree of rigidity at least in the edge portions 21-22 thereof.

At the top end of the vertical conveyor 2, the two conveyor belts 2a and 2b are turned round in directions opposite to each other to travel downwardly to the bottom turning ends along respective vertical paths indicated at 25 and 26 in FIG. 1. The belt paths 25-26 are each defined by a set of outer guide rollers 3c-3d or 3e-3f, which are arranged at larger intervals to guide the adjacent descending conveyor belt on the front and rear sides thereof.

At the end of descent, the two conveyor belts (25 and 26) are turned round symmetrically in directions opposite to each other, for example, around a pair of bottom guide pulleys 4a and 4b of identical shape.

The sets of guide rollers 3a, 3b, 3c, 3d, 3e and 3f are all journaled on the vertical casing frame 1.

One form of bulk projector will next be described with reference to FIGS. 3 and 4.

In this embodiment, the thrower type bulk projector, generally indicated by reference numeral 5, is supported on a frame 50 separate from the casing frame, on which the vertical conveyor described above is supported, the bulk projector 5 includes, as its major components, two rotary discs 51a and 51b of the same diameter and an endless projector belt 52. The rotary discs 51a and 51b serve as a guide for bulk material and that for the projector belt 52. Specifically, the projector belt 52 passes under the rotary discs, closely engaging about half the periphery thereof, as indicated at 521 in FIG. 3, to serve in cooperation with the rotary discs to guide bulk material through the projector. As indicated at 522 in FIG. 3, the projector belt 52 is directed from its bulk guide region 521 upwardly forward in a direction toward the belt junction at the bottom of the vertical conveyor 2 where two conveyor belts 2a and 2b meet each other to rise together. As shown, the thrower type bulk projector 5 is equipped with a bulk supplychute 53.

The two rotary discs 51a and 51b are arranged opposite to each other at a predetermined spacing therebetween and, as shown, are rotatably mounted on a stationary shaft 511 through the intermediary of respective ball bearings 512-513 at locations adjacent to the opposite ends of the stationary shaft 511. This shaft is fixedly mounted on the projector frame 50 transversely thereof.

Figure 4:
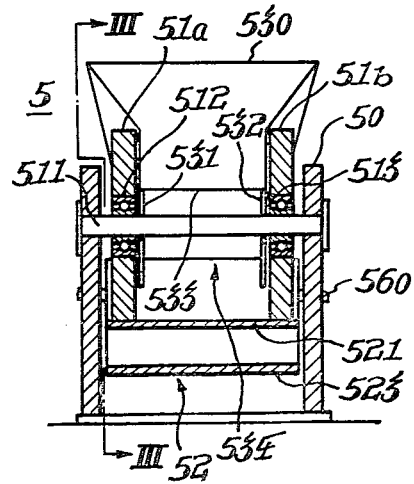
FIG. 4 is a cross-sectional front elevation of the bulk projector, taken along the line IV—IV in FIG. 3.

The projector belt 52 is turned downward around a combined guide and drive pulley 54 at the top of the upgrade belt region 522, which extends upwardly forward from the bulk guide region 521, and, passing around a bottom guide roller 55, arranged under the rotary discs, returns to a rear guide pulley 56, as indicated at 523 in FIG. 3. The rear guide pulley 56 is journaled on a shaft 560 provided to the rear of the rotary discs. Turning around the rear guide pulley 56, the projector belt 52 now proceeds in a substantially horizontal direction, as indicated at 520, to make close contact with the lower halves of rotary discs 51a and 52b, as at 521. The drive pulley 54 referred to above is driven by means of a drive motor 57, which is mounted on the projector frame 50 at an appropriate location, to drive the projector belt 52 at a high speed normally in the range of from 450 m/min to 1000 m/min. Reference numeral 58 indicates a drive belt arranged between the drive pulley 54 and the output shaft of drive motor 57; and 59 indicates a driven pulley fixedly mounted on the shaft of drive guide pulley 54.

The bulk supply chute 53 has a wide top opening 530 for reception of bulk material and opposite side plates 531 and 532 which extend downwardly along the inside of the respective rotary discs 51a and 51b to the top surface of the horizontal region 520 of projector belt 52. The side plates are thus held at their bottom end in close contact with the top surface of the projector belt so that any sidewise leakage of bulk material from the chute bottom is effectively prevented. Also, the chute includes a front and a rear wall plate, the front wall plate 533 being cut open at the bottom to form a bulk discharge opening 534, which is connected with the chute bottom opening along the top surface of projector belt 52.

Bulk material as thrown into the chute 53 and falling onto the horizontal region 520 of projector belt 52, which is travelling at high speed, starts to move together with the projector belt and is held pressed against the belt surface under a substantial centrifugal force which acts on the bulk material while the projector belt 52 is passing beneath the rotary discs substantially around half the periphery thereof. Owing to this, the bulk material is effectively accelerated to a speed equal to that of belt travel, which is approximately 600 m/min, so as to be projected from the top of the upgrade region 522 of projector belt 52 in a direction extended therefrom, as indicated by the arrow in FIG. 3. The direction in which the bulk material is projected is such that the material, reaching the bottom junction of the two conveyor belts 2a and 2b. Where they meet or overlap each other, acts to force the medial portions of the conveyor belts apart from each other under the momentum or inertial effect of its own and is packed into the space between the overlapping conveyor belts.

As the two overlapping conveyor belts are normally travelling upward at a speed of the order of 250 m/min, the bulk material continuously thrown from the bulk projector is conveyed upwardly in a continuous fashion in a state filled in the tubular bulk holding space A formed between the two conveyor belts.

Referring again to FIG. 3, the bottom guide pulleys 4a and 4b around which the respective conveyor belts 2a and 2b are guided at their bottom are more or less vertically displaced relative to each other. Namely, the bottom guide pulley 4b for one of the conveyor belts, 2b, which is opposite to the bulk projector 5 is disposed some distance below the other guide pulley 4a so that the conveyor belt 2b has a portion 20 of its front surface exposed for reception of bulk material, extending downwardly from the junction of the two conveyor belts. It is to be noted here that the two conveyor belts are themselves guided to turn round at the bulk receiving end of the vertical conveyor in opposite directions in substantially symmetrical relation to each other, as described hereinbefore.

Figure 5:
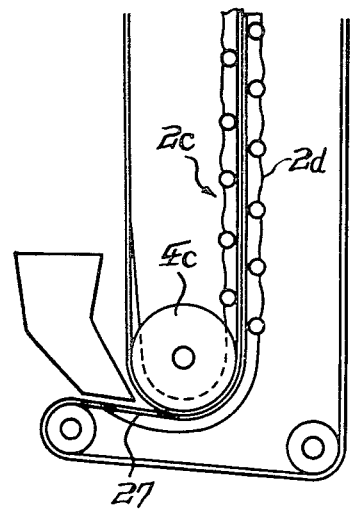
FIG. 5 is a fragmentary side elevation of a vertical conveyor, showing a typical prior art of bulk feeder provided therefor.

Reference will next be had to FIG. 5, which illustrates a typical prior art of bulk feeder unit which has previously been under research for use in a vertical conveyor. In this previous form of bulk feeder, one of the conveyor belts is arranged to have a horizontally extending region 27 designed to receive and support bulk material to be conveyed and the bulk material once laid on the horizontal belt region is subsequently held clamped between the two conveyor belts 2c and 2d. Specifically, said one of the two conveyor belts, 2d, is extended at the bottom rearwardly of the other conveyor belt 2c around a bottom guide roller 4c in a state overlapping the latter 2c, which is trained around the guide pulley 4c in direct contact therewith, to form a horizontal bulk-receiving region 27. This arrangement, however, has involved a disadvantage that one of the conveyor belts, 2d, forming the horizontal bulk-receiving region 27 is unduly stretched while proceeding around the guide roller 4c radially outside of the other conveyor belt 2c. In contrast to this, in the vertical conveyor constructed and arranged according to the principles of the present invention, neither of its two conveyor belts is subjected to any such undue stretching at its bulk-receiving bottom end.

It is to be noted that the bulk projector described hereinbefore can practically be made small in size, with the diameter of rotary discs 51 and the width of projector belt 52 both specified in the range of from 30 cm to 60 cm, while having a bulk projecting capacity of the order of 60 to 150 m$^3$ per hour. Such compact unit can easily be mounted on an appropriately extended portion of the casing frame provided to support the vertical conveyor, without necessitating any separate frame as previously required therefor.

Description will next be made of some practical applications of a vertical bulk conveying apparatus which includes a combination of the above-described vertical conveyor 2 and bulk projector 5.

The vertical bulk conveying apparatus is so arranged that bulk material thrown into a chute is fed under centrifugal force to the bottom of the vertical conveyor so as to be held between the two overlapping conveyor belts and conveyed thereby upwardly in a continuous fashion and can be made characteristically compact as an integral combination of the vertical conveyor with the bulk projector for loading the latter. Because of this character, the vertical conveying apparatus is advantageously usable, in combination with a rotary bucket wheel operable to scoop up bulk material and throw it into the bulk projector chute, to form a vertical bulk-delivering apparatus which is capable of efficiently delivering the bulk material vertically upward in a continuous fashion.

Figure 6:
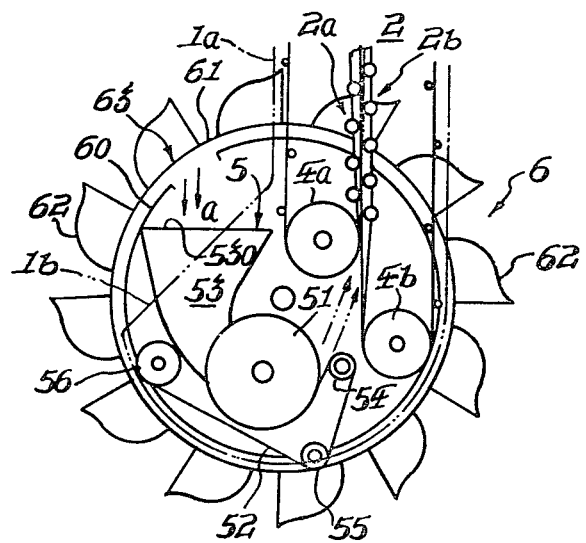
FIG. 6 is a fragmentary side elevational view showing the essential part of a vertical bulk-delivering apparatus which utilizes the bulk receiving structure shown in FIGS. 3 and 4.

One specific example of such vertical bulk-delivering apparatus is illustrated in FIG. 6, in which the same references have been used as in FIGS. 1 to 4 for similar parts having the same functions.

In this embodiment, the vertical conveyor 2, which includes two endless conveyor belts 2a and 2b guided around respective bottom guide pulleys 4a and 4b to proceed therefrom upwardly in face-to-face relation, defining a substantially vertical conveyor line, and is supported on the vertically extending section 1a, indicated by the chain-dotted lines, of the casing frame. As shown, the frame includes an overhanging portion 1b extended laterally thereof on which is integrally carried a bulk projector unit 5, which is comprised of a pair of rotary discs 51, a projector belt 52, a combined drive and guide pulley 54, guide rollers 55 and 56, a bulk chute 53 and a drive source (not shown here) associated with the drive pulley. Reference numeral 6 generally indicates a bulk feeder, of the rotary bucket wheel type, which includes a substantially cylindrically shaped drum support frame 60, which is also supported on the overhanging portion 1b of the conveyor casing frame sidewise of the bulk-receiving region of vertical conveyor 2 including the bulk projector 5.

Rotatably supported on the drum support frame 60 is a rotary drum 61 which is driven to rotate clockwise, as viewed in FIG. 6, by a well-known form of drive mechanism (not shown and described herein). A multitude of scooping buckets 62 are mounted on the rotary drum 61 at regular intervals around the periphery thereof. Upon rotation of the rotary drum 61, the bulk material scooped up by the buckets 62 is thrown into the drum support frame 60, as indicated by the arrow, through a charging port 63 formed in the top thereof. The chute 53 of bulk projector 5 is extended at the top into the drum support frame 60 to form a bulk inlet mouth 530 opening upwardly toward the charging port 63 of the frame 60.

When the rotary drum 61 is rotated in the well-known manner at a location where bulk material is piled while at the same time operating the vertical conveyor 2 and bulk projector 5, the bulk material scooped up and thrown into the opening 63 of drum support frame 60 successively by buckets 62 on the rotating drum 61 is continuously fed through the chute 53 into the bulk projector 5 and loaded under the action thereof into the vertical conveyor to be delivered vertically upward.

Such vertical delivering apparatus, including a vertical bulk conveying apparatus and a rotary bucket wheel, is characteristically capable of serving a dual function of scooping up bulk material continuously to feed it into a bulk projector and also vertically delivering the fed material. Owing to this feature, the apparatus can be advantageously employed as a bulk delivering machine unit to realize a vertical delivering system, suited, for example, for use in a deep-storing yard where bulk material is stored in large depths and hardly be delivered out with any efficiency.

Referring next to FIGS. 7 to 11, reference numeral 7 generally indicates a vertical delivering system for yard use, which comprises, in combination, a vertical bulk delivering unit, generally indicated by reference numeral 71, an intermediate transfer apparatus 74, and a unit carrier provided for carrying the delivering unit 71 over the whole area of the storing yard. The delivering unit 71 includes a vertically elongate cylindrical frame body, in which a vertical conveyor 2 is supported, and is provided at the bottom with a bulk projector (not shown here) and a bucket wheel type bulk scooper 6. The intermediate transfer apparatus 74 serves to transfer the bulk material as discharged from the vertical conveyor onto a stationary conveyor, as will be described hereinafter in detail.

Figure 7:
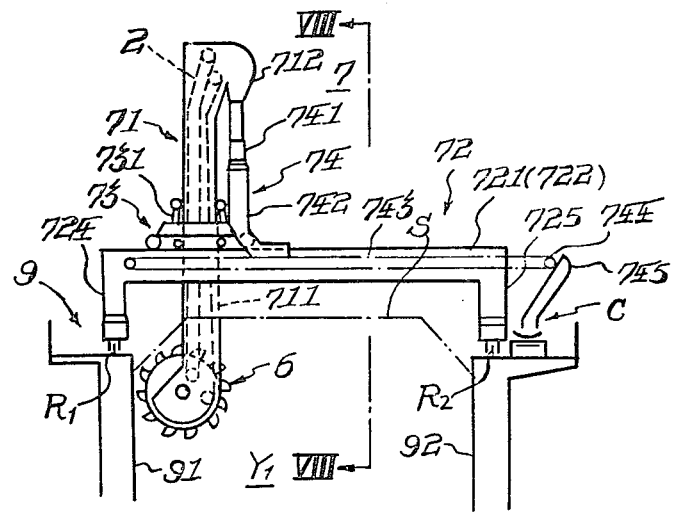
FIG. 7 is a side elevation, partly in section, taken along the line VII—VII in FIG. 8, of a yard vertical delivering system including as a major part thereof the vertical delivering apparatus shown in FIG. 6.
Figure 8:
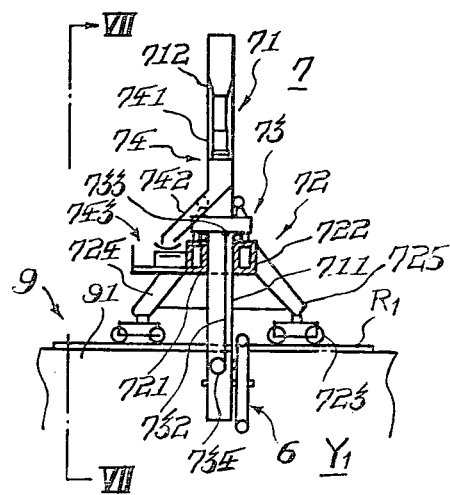
FIG. 8 is a cross-sectional front elevation of the system taken through the beam structure thereof along the line VIII—VIII in FIG. 7.

Reference numeral 9 generally indicates a storing place for bulk material which, in the example of FIGS. 7 and 8, is a deep-storing yard $Y_1$ built on a definite lot of ground as surrounded on its opposite sides by retaining walls 91 and 92 of substantial height.

Carrier-supporting rails $R_1$ and $R_2$ are laid parallel to each other on top of the respective retaining walls 91 and 92 and on which rails is mounted a unit carrier to travel longitudinally of the yard $Y_1$ which is comprised of a travelling frame 72 including two elongate parallel beams 721 and 722 mounted on the rails in staraddling relation to the yard $Y_1$ and wheeled (723) travelling leg sections 724-725 mounted on the respective beams sidewise thereof, and a trolley type unit support frame 73 mounted on the top of parallel beams 721-722 of travelling frame 72 for movement therealong.

The unit support frame 73, which is supported itself on the travelling frame 72, has a body structure of annular or rectangular framework through which the vertical casing frame 711 of delivering unit 71 extends and supports the casing frame 711 for vertical displacement. Reference numeral 731 indicates guide means for the vertical unit casing or frame 711; and 732 indicates a rope for raising and lowering the delivering unit 71, which is secured at one end to the unit support frame 73, as indicated at 733 in FIG. 8, and wound at the other end around a winding drum 734 arranged on the vertical casing frame 711 adjacent to the bottom end thereof.

As will readily be understood, the delivering unit 71, supported on the unit carrier 72-73 of the structure described above, is movable in directions longitudinal and transverse of the storing yard $Y_1$ under operation of the travelling frame 72 and unit support frame 73, respectively, and is thus capable of carrying the wheel bucket 6 to any desired location in the yard $Y_1$. In addition, the single delivering unit 71 with its vertical frame 711 adapted for vertical movement can serve by itself to deliver all the bulk material S deep-stored between the retaining walls 91-92, as indicated in FIG. 7 by the chain-dotted line, starting with the top layer of the bulk material and progressing downward to the yard bottom finally to deliver the bottom bulk layer, not indicated.

Arranged on one of the retaining walls, e.g., 92, in parallel with the rail $R_2$, is a stationary conveyor C which serves to convey the bulk material delivered up from the yard to a predetermined collecting place.

The intermediate transfer apparatus 74 referred to hereinbefore is provided to act between the delivering unit 71 and the stationary conveyor C.

The vertical frame 711 of delivering unit 71 is provided at the top with a bulging chute type of bulk discharging mouth 712, through which bulk material as conveyed to the top end of vertical conveyor 2 is discharged downwardly sideways thereof and directed into tubular structure 741 of intermediate transfer apparatus 74, which is telescopically extensible. The telescopic structure 741 is connected at the bottom end with the top end of a side chute 742, which is carried by the delivering unit support frame 73 and has a bottom discharge end opening above an intermediate belt conveyor 743, which is provided on the travelling frame 72 along one side of the beam 721, as clearly seen in FIG. 8, and extended over the whole length thereof.

The intermediate belt conveyor 743 is operated so as to convey the bulk material discharged from the side chute 742 to the stationary conveyor C and has a discharging end 744 which is extended beyond the beam 721 and provided with an appropriate guide chute 745 through which bulk material is laded onto the stationary conveyor C.

Figure 9:
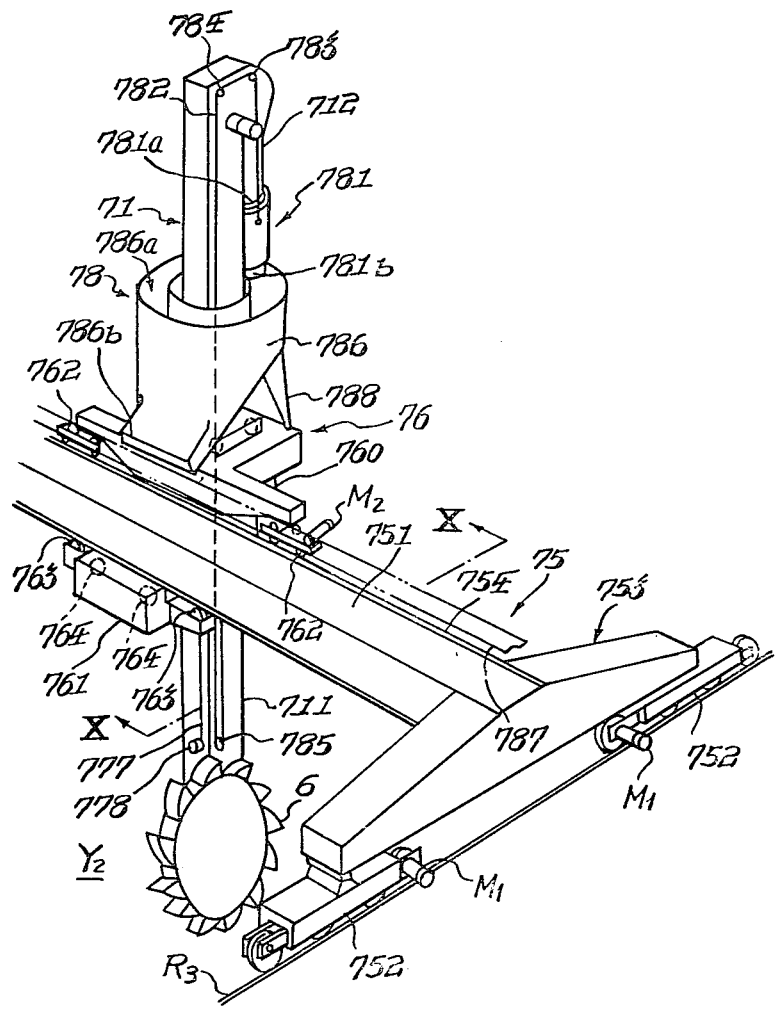
FIG. 9 is a fragmentary oblique view showing part of a different form of yard vertical delivering system.
Figure 10:
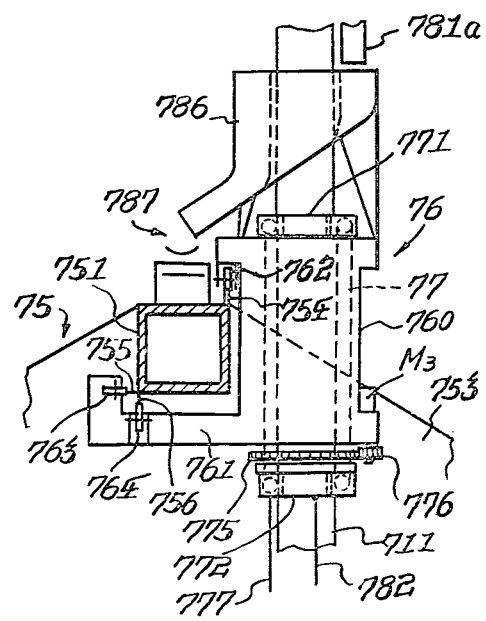
FIG. 10 is a fragmentary cross-sectional elevation, taken through the beam structure along the line X—X in FIG. 9, and showing the essential part of the conveyor carrier.
Figure 11:
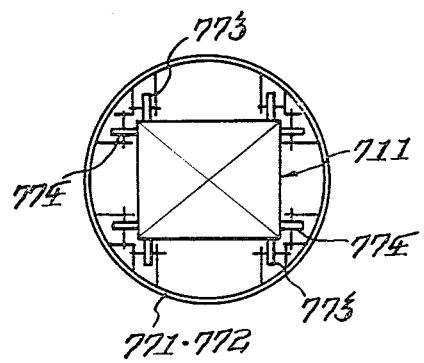
FIG. 11 is an enlarged plan view of the annular flange structure of the carrier.

In another form of vertical yard delivering apparatus, which is illustrated in FIGS. 9 to 11, the unit carrier provided for transportation of the delivering unit 71 is constructed essentially of a ground travelling frame 75 including a beam 751 mounted over a level land yard $Y_2$ in straddling relation thereto and a unit support frame 76 movable along the beam 751. The beam 751 is supported at each of its ends by a travelling leg structure 753, which is of substantial height and, provided with carriage means 752. (It is to be understood that the travelling frame 75, including beam 751, is of a symmetrical formation having the same structure at its opposite end though one end portion of such frame is shown here.)

The ground travelling frame 75 can travel on its own longitudinally of the yard $Y_2$ along ground rails $R_3$ which are laid in parallel to each other on the opposite sides of the yard and on which rails the frame 75 is mounted by means of carriages 752. Reference character $M_1$ indicates a self-propelling motor mounted on the frame 75.

In this embodiment, the unit support frame 76 indicates a hollow tubular body structure 760 mounted on the ground travelling frame 75 for movement along the beam 751 and which structure 760 supports the vertical casing or frame 711 of delivering unit 71, of the same structure as that in the embodiment previously described, while allowing the frame 711 to move vertically and rotate about the vertical axis thereof. The beam 751 is provided along one edge of the top surface thereof with an upwardly directed rail 754 which extends over the whole length of beam 751 and, as clearly seen in FIG. 10, is also provided along the bottom beam edge diagonally opposite to the top edge with a laterally directed rail 755 and a downwardly directed rail 756. Supported on the upwardly directed rail 754 are running wheels 762 which are mounted on the underside of an integral top overhang portion of the body 760 of delivering unit support frame 76. Supported respectively on the laterally directed and downwardly directed rails 755 and 756 are running wheels 763 and 764, which are journaled vertically and horizontally, respectively, on the extreme end portion of a bracket arm 761, which is extended laterally from the bottom of the unit support frame 76 and upwardly bent at its extreme end so as to surround the adjacent bottom edge of beam 751. With such supporting arrangement, the tubular body structure 760 of unit support frame 76 is supported sidewise of the beam 751 with the axis of its tubular hollow held substantially vertical and, upon operation of motor means $M_2$ (FIG. 9), is freely movable in the direction longitudinal of the beam 751.

A hollow cylindrical guide 77 is, fitted in the cylindrical hollow in the body 760 of delivering unit support frame 76 for rotation about the axis thereof and rotatably supported on the top surface of the frame body 760 by way of an annular flange 771 secured to the top of the tubular guide 77. Secured to the bottom of tubular guide 77 is an annular flange 772 similar to the top flange 771. As shown in the plan view of FIG. 11 on an enlarged scale, both the top and bottom flanges 771 and 772 are provided inside thereof with four pairs of guide rollers 773 and 774 each to guide one of the four corners of the vertical frame 711 of rectangular cross-section of the delivering unit 71 along the adjoining edges of the frame corner. In this manner, the vertical frame 711 is guided by the tubular guide 77 for vertical movement and against rotation relative thereto. The tubular guide 77 for the delivering unit is provided with a gear wheel 775 secured thereto around the periphery of the cylindrical barrel of tubular guide 77 concentrically therewith. Mounted on the unit support frame 760 are a drive motor $M_3$ and a pinion 776 coupled therewith and held in mesh with the gear wheel 775 so that the tubular guide 77 is rotatable about its axis relatively to the unit support frame 760 under the drive of motor $M_3$. Vertical movement of the delivering unit 71 relative to the tubular groove 77 is obtainable, as with the case of the apparatus shown in FIGS. 7 and 8, by a rope arrangement which includes a rope 777 secured at its top end to the bottom flange 772 of tubular guide 77 and a rope winder 778 provided on the bottom of the vertical frame 711 and to which the rope 777 is secured at its bottom end.

On one side of the level land bulk-storing yard $Y_2$, a stationary bulk transporting conveyor (not shown) is laid in parallel therewith in accordance with the common practice. In order that bulk material as delivered by the delivering unit 71 from the yard may be carried to the stationary conveyor, an intermediate transfer apparatus, generally indicate by reference numeral 78, is provided which is connected to the bulk discharge port 712 of the delivering unit 71 (see FIG. 9).

The intermediate transfer apparatus 78 includes a tubular telescopically extensible structure 781 with its innermost tubular section 781a joined with the bulk discharging mouth 712 of delivering unit 71. The outermost tubular section 781b of the telescopic structure 781 is suspended on a hanging cord 782 at a predetermined height above an annular inlet opening 786a of an annular chute structure 786, which is fixedly mounted on the unit support frame 76.

The hanging cord 782, fixed at one end to the outermost tubular section 781b, is directed over two guide sheaves 783-784, mounted on one side of vertical frame 711 at the top thereof, as shown in FIG. 9, to proceed downwardly along the frame and is directed over another guide shave 785, mounted on the frame bottom, to proceed upwardly therefrom and is secured at the other end to the bottom flange 772 of tubular guide 77, as shown in FIG. 10. With this arrangement, it is to be noted that the outermost tubular section 781b of telescopic structure 781 is held at all times at a predetermined level of height irrespective of the vertical position of the delivering unit 71. The outermost tubular section 781b is funnel-shaped at the bottom so as to be loosely fitted in the annular inlet opening 786a of annular chute 786 so that, upon rotation of the delivering unit 71, the outermost section 781b proceeds freely over the annular inlet opening 786a.

As the annular chute 786 has a tubular body through which the vertical frame 711 of delivering unit 71 is fitted loosely, as illustrated in FIG. 9, and is so constructed that the bulk material received in the annular inlet opening 786a is all collected in a discharging mouth 786b at the bottom of annular chute 786 to be fed onto an intermediate conveyor belt 787, which is arranged on the top surface of beam 751 and connected by conventional means with the stationary conveyor previously referred to, though not shown in this illustration.

As will be apparent from the foregoing description, in this embodiment, the bucket wheel 6 supported on the delivering unit 71 at the bottom thereof can be brought to any desired location in the level land yard $Y_2$ and bulk material as scooped up by such bucket wheel is effectively transferred onto the stationary conveyor irrespective of the vertical and angular positioning of the vertical frame 711 of the delivering unit. Further, in this apparatus, the delivering unit is movable within the yard $Y_2$, while being held at all times vertical and this makes the apparatus particularly suitable for use in delivering bulk material from such a small-scale yard as precluding use of any bulky long boom. In addition, as the bulk scooping bucket wheel 6 can be swung freely in a horizontal plane, the apparatus is capable of delivering bulk material from any fan-shaped area in the yard and thus has an advantageous characteristic of enabling delivering operation within any restricted yard region or compartment to be performed with increased efficiency.

Description will next be made of a vertical bulk cargo delivering system, utilizing the principles of the delivering unit described, with reference to FIG. 12, in which the same references have been used as in FIGS. 9 to 11 for similar parts which have the same functions.

Figure 12:
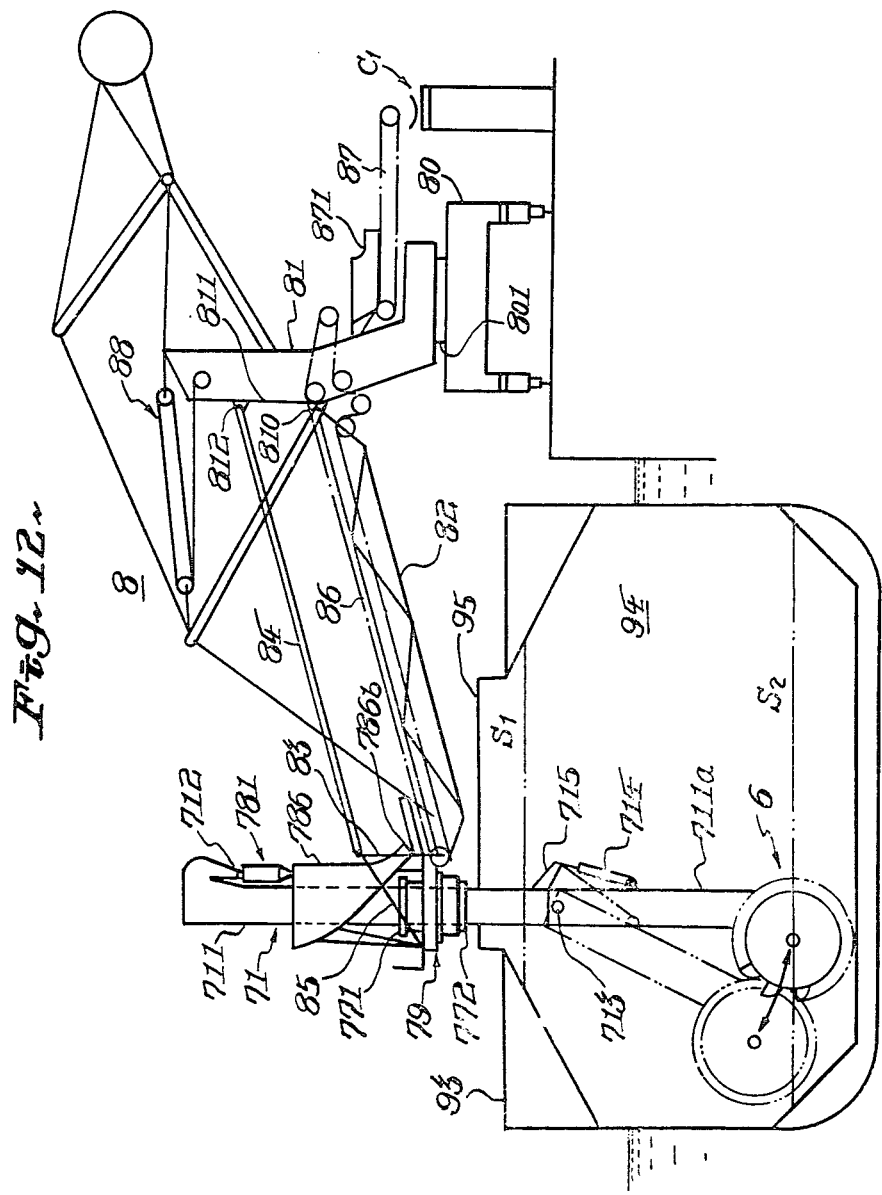
FIG. 12 is a schematic elevational view of a bulk unloading system of the vertical delivering type.

In the system of FIG. 12, as in the apparatus shown in FIGS. 9 to 11, the delivering unit 71 extends through a tubular guide structure 77, which is rotatably supported on the unit support frame 79 by way of a top and a bottom flange 771 and 772, and is supported by the tubular guide 77 for vertical movement. Also, bulk material as discharged from the delivering unit through its bulk discharging mouth 712 is fed into an annular chute 786 through the intermediary of a telescopically extensible tubular structure 781, which is held at all times at a predetermined level of height. Though not shown in FIG. 12, a hanging cord for hanging the tubular structure 781 and a rope for vertical displacement of the delivering unit are also provided in this embodiment in quite the same manner as in the previous embodiment.

It is to be noted clearly, however, that the system of FIG. 12 is distinguishable from the apparatus shown in FIGS. 9 to 11 in the following points: First, in the system of FIG. 12 the unit support frame 79 is carried by a slewing beam type unloading unit, generally indicated by reference numeral 8, at the free end of a luffing boom 82 thereof and this necessitates a modified form of intermediate transfer apparatus to be connected with the annular chute 786. Secondly, the vertical casing frame 711 of the delivering unit is made flexible, including a tiltably jointed lower section.

Description will now be made of the embodiment, principally centering about the distinguishing features stated above.

Reference numeral 80 indicates a wheeled truck movable along a cargo handling site such as a wharf or a pier of a port and on which truck a pillar 81 is mounted by way of a rotary platform 801. The above-referred-to luffing boom 82 is fulcrumed on the pillar 81 at 810 for luffing motion relative thereto.

A movable frame member 83 of a predetermined height is hinged at its bottom end to the free end of the luffing boom 82. A connecting member 84 is arranged between the top end of movable frame member 83 and a second fulcrum point 812 on the vertical portion 811 of pillar 81. It is to be noted that the length of distance between the first and second fulcrum points 810 and 812 on the pillar 81 is equal to the height or vertical length of movable frame member 83. Also, the lengths of the boom 82 and connecting member 84 are made equal to each other. With this arrangement, the four members, including pillar 81, boom 82, movable frame member 83 and connecting member 84, jointly form a parallelsgrammic framework and the movable frame member 83 is held at all times vertical irrespective of the luffing angle of boom 82. The delivering unit support frame 79 is hinged on one side thereof to the free end of boom 82 in the same manner as the movable frame member 83 and the other side of unit support frame 79 is connected with the top end of movable frame member 83 by way of a connecting frame member 85 so that the unit support frame 79 is supported in a horizontal position. With this arrangement, it will be apparent that the vertical casing frame 711 of delivering unit 71 is held at all times vertical during luffing movement of the boom 82.

Provided on the luffing boom 82 is a boom conveyor 86 which extends from the free end of boom 82 to a point at the rear of pillar 81. The discharging mouth 786b of the above-described annular chute 786 is positioned above the feed end of boom conveyor 86 while at the discharge end of the latter is arranged a receiving chute 871 which is formed at the head of a second intermediate conveyor 87 and has a wide inlet opening. The second intermediate conveyor 87 operates between the discharge end of boom conveyor 86 and a stationary conveyor $C_1$, which is arranged in parallel to the track on which wheeled truck 80 is mounted. Reference numeral 88 indicates boom luffing means.

In this illustration, the delivering unit works in a bulk storing place in the form of a hold 94 of a cargo vessel 93. As usual, the cargo hold 94 has a deck opening 95 limited in area for the capacity thereof. For bulk delivering from such storing place, it is highly desirable that the vertical frame of the delivering unit has a bottom section made flexible, as stated hereinbefore.

The vertical frame illustrated in FIG. 12 has a bottom section 711a formed separate from the remaining, vertical frame section 711 and pivotally connected thereto by means of a pivot shaft 713 for tilting movement about the axis thereof. Reference numeral 714 indicates an extensible hydraulic cylinder unit arranged between a bracket 715 secured to the vertical frame section 711 and the movable frame section 711a. Upon extension of the cylinder unit 714, the movable section 711a of the vertical casing frame is tilted laterally, as indicated by the chain-dotted lines, so that the bucket wheel 6 at the bottom of the delivering unit 71 may be brought close to any side wall surface of the cargo hold 94, as illustrated, though the delivering unit 71 is only movable within the restricted deck opening 95 of cargo hold 94.

As the vertical frame of delivering unit 71 is flexed in the manner described, the vertical conveyor supported therein must naturally be flexed in a similar fashion. However, as the flexing angle, that is, the angle of tilt of the bottom frame section 711a, is at most of the order of 30 degrees, there is no danger at all of the conveyor belts being injured to any substantial extent. By the combination of luffing movement of the boom 82 with vertical movement of the delivering unit 71, the system illustrated is capable of freely delivering bulk material out of the cargo hold through the whole depth of material, from the top surface $S_1$ of material as filled in the hold to the lowest level $S_2$, which is close to the ship's bottom. Also, the system is capable of delivering all the bulk material at any level in the hold with extremely high efficiency by progressively displacing the wheeled truck structure 8 while slewing the boom 82, with the delivering unit maintained at a definite level and the bucket wheel 6 held in a position laterally, extended, as indicated by the chain-dotted lines in FIG. 12.

Bulk material as discharged from the delivering unit 71 in a continuous fashion is fed through the telescopically extensible tubular guide 781 and annular chute 786 onto the boom conveyor 86 and is further sent through the latter and second intermediate conveyor 87 to the stationary conveyor $C_1$, which carries the material to a land installation, not shown.

It will be apparent to those skilled in the art that the range of application of the delivering unit 71 of the present invention is not limited to the embodiments shown and described above.

Though, in these embodiments, the two overlapping conveyor belts constituting the vertical conveyor 2 have been described as arranged so as to turn round in opposite directions in substantially symmetrical relation to each other at the bottom end of the substantially vertical conveyor line, modifications may be made therein, without departing from the spirit of the present invention, to guide one or both of the endless conveyor belts so as to be more or less flexed intermediate the ends of the conveyor line as long as they are guided at locations immediately below the conveyor line to turn round symmetrically in opposite directions and the flexing angle is limited to 30 degrees or thereabout. In such range of flexing angle, practically no impairment of the conveyor belts results.

Figure 13:
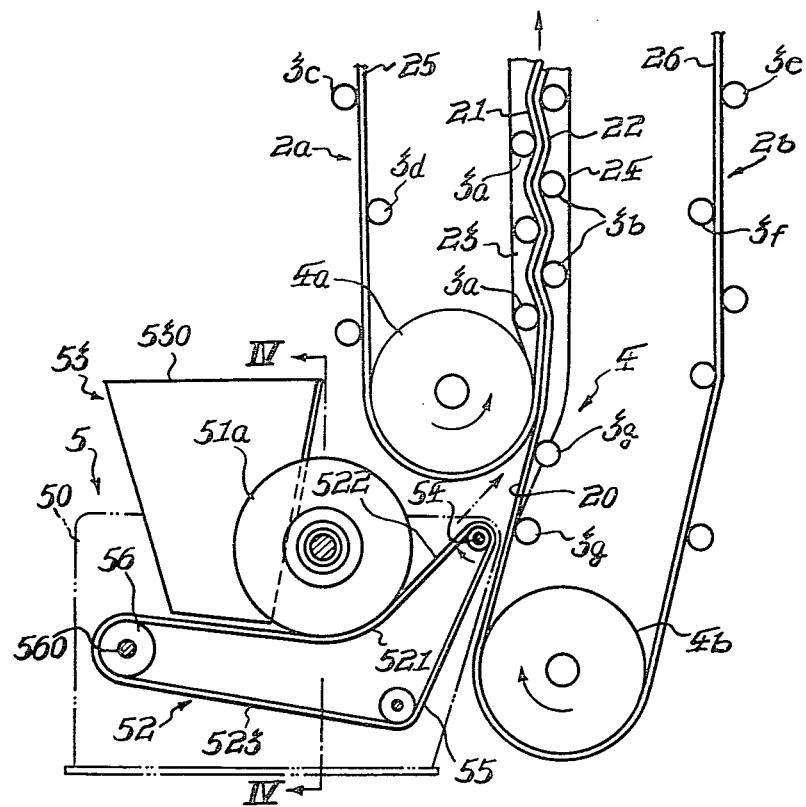
FIG. 13 is a view similar to FIG. 3, illustrating the bottom portion of a vertical conveyor with a modified form of bulk receiving structure.
Figure 14:
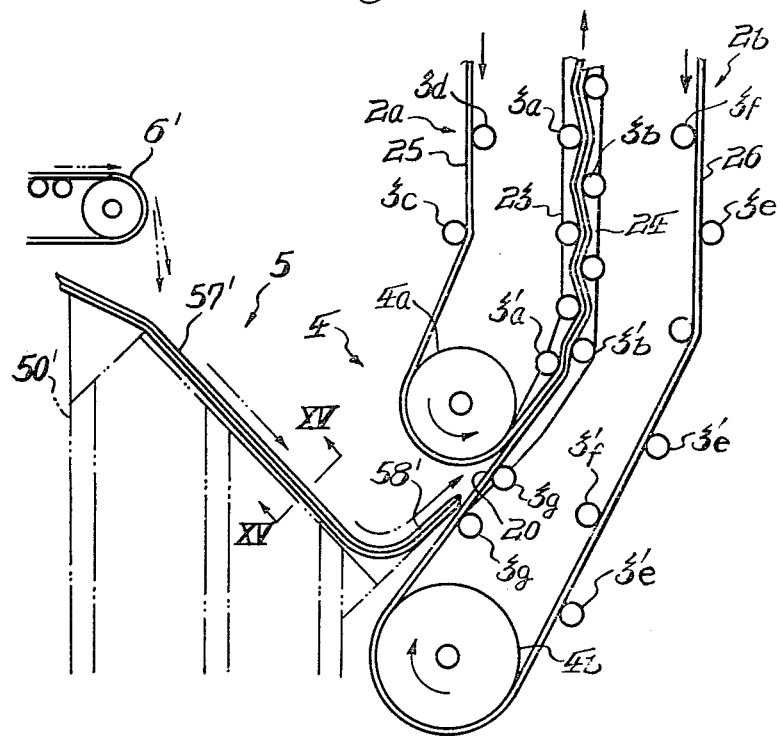
FIG. 14 is a fragmentary side elevation of a vertical conveyor employing another form of bulk projector.

FIGS. 13 and 14 illustrate further embodiments of the vertical conveyor of the present invention which include each a bulk-receiving bottom region more or less modified in the line of the viewpoint stated above.

For purposes of convenience in describing the embodiments of FIGS. 13 and 14, one of the two endless conveyor belts, 2a, of the vertical conveyor, which is arranged on the projector side thereof, will be referred to below as first conveyor belt and the other conveyor belt 2b, arranged opposite to the discharge end of the projector, as second conveyor belt. Also, the bottom guide pulleys 4a and 4b, over which the respective conveyor belts 2a and 2b are guided at the bottom in directions opposite to each other, will be referred to below as first and second guide pulleys, respectively.

In the apparatus illustrated in FIG. 13, the first guide pulley 4a for guiding the first conveyor belt 2a at its bottom end is arranged above the discharging end of bulk projector 5, the first conveyor belt 2a being bent around the pulley 4a toward the descending belt path 25.

On the other hand, the bottom end portion of the second conveyor belt 2b, arranged opposite to the projector discharging end, is passed over the adjacent side of the first guide pulley 4a in substantially a straight line and drawn slightly forwardly toward the bulk projector by the second guide pulley 4b, which is arranged downwardly offset from the first guide pulley 4a and located obliquely below the area of said discharging end of said thrower type projector 5. With this arrangement, the bottom end portion of second conveyor belt 2b forms a slightly inclined bulk receiving face 20 which is exposed to the projector discharging end. This bulk-receiving face 20 provides many benefits to receive the bulk material and feed it into the belt junction aforesaid. The second conveyor belt 2b is guided at its bottom end around the second guide pulley 4b in a direction opposite to the first conveyor belt 2a substantially in symmetrical relation thereto to enter the descending belt path 26.

Reference will next be had to FIG. 14, in which another example of bulk-receiving end arrangement of modified design is illustrated. In this embodiment, in the groups of inner guide rollers 3a and 3b, which define a substantially vertical conveyor line, a few lowermost rollers are arranged in positions more or less offset successively toward the bulk projector side, as indicated at 3'a and 3'b, so that the conveyor line is bent forwardly at its bottom and the first guide pulley 4a, around which the first conveyor belt 2a is guided toward its descending path 25, is arranged along a line of extension of the bent bottom portion of the conveyor line and above the discharging end of bulk projector 5.

On the other hand, the bottom end portion of the second conveyor belt 2b, which is arranged opposite to the bulk projector 5, is extended from the bent bottom portion of the conveyor line forwardly downward along the adjacent side of first guide pulley 4a substantially in a straight line. The second conveyor belt 2b thus drawn forwardly below the first guide pulley 4a is guided to its path of descent 26 in substantially symmetrical relation to the first conveyor belt 2a by the second guide pulley 4b, which is downwardly offset with respect to the first guide pulley 4a. Again, in this arrangement, the second conveyor belt 2b forms a slightly inclined bulk-receiving face 20 extending below the first guide pulley 4a.

Though, in these types of bulk-receiving arrangement, the two conveyor belts, jointly defining a conveyor line, are flexed at a point toward the bottom end thereof, there is no danger of the conveyor belt being injured, as with the case of the apparatus shown in FIG. 3, as the angle through which the conveyor belts are flexed is limited to 40 degrees or below (and is approximately 35 degrees in the embodiment of FIG. 14) and the conveyor belts thus flexed are subsequently guided around the respective end pulleys in substantially symmetrical relation to each other.

In the apparatus of FIG. 13, bulk material as fed into the chute 53 of bulk projector 5 is thrown at a speed as high as approximately 600 m/min, as described hereinbefore, in a direction toward the belt junction where the two conveyor belts meet each other, so as to be laden therebetween under the inertial effect or momentum of the bulk material itself. In this connection, it is to be recognized that the slightly inclined bulk-receiving face 20 of second conveyor belt 2b, which extends downwardly from the adjacent side of first guide pulley 4a, helps enable the bulk material thrown by the projector 5 to be received between the two conveyor belts efficiently without loss. Reference numeral 3g indicates auxiliary guide rollers arranged on the rear side of the bulk-receiving face region of second conveyor belt 2b to support the opposite edges thereof and each having the same structure as inner guide rollers 3b.

Figure 15:
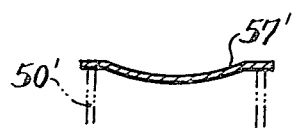
FIG. 15 is a cross section of the projector chute, taken along the line XV—XV in FIG. 14.

In the embodiment of FIG. 14, an example of curved chute type bulk projector 5 is employed which is formed as a downwardly steeply inclined chute 57' of trough-like section (see FIG. 15), which is curved at the bottom end upwardly in a circular arc to form a bulk discharging end 58'. This bulk projector 5 is supported on an appropriate frame structure 50' in a manner such that bulk material as thrown off the discharging end 58' is directed to the belt junction where the two conveyor belts 2a and 2b come to join each other.

As illustrated, bulk material is supplied continuously by means of a supply conveyor 6' and thrown onto the top portion of the downwardly inclined chute 57' to rapidly slide down therealong and, rushing out from the upwardly inclined discharging end 58' under the effects of centrifugal force and inertia, is positively fed into the vertical conveyor at the bottom junction of the two conveyor belts. Again, in this embodiment, the upwardly inclined bulk-receiving region 20 of second conveyor belt 2b, the opposite edges of which are supported by auxiliary guide rollers 3g, helps enable the bulk material to be received by the vertical conveyor in a particularly stable and efficient manner.

As will be apparent from the illustration of FIG. 13, a vertical delivering apparatus including a small-sized bulk projector such as shown in FIGS. 3 and 6 is applicable to the system shown in FIGS. 7 to 12 as well as to the one of FIG. 6. It will be readily understood that, when combined with a projector of the type illustrated in FIG. 14, the delivering apparatus of the present invention is usable also in other different fields of the art.

While several complete embodiments of the invention have been disclosed herein, it will be appreciated that modification of these particular embodiments of the invention may be resorted to without departing from the scope of the invention.

What is claimed is:

1. A vertical bulk cargo delivering system comprising: a vertical bulk-delivering unit (71) including a vertical bulk-conveying apparatus comprised of an integral combination of a vertical conveyor (2) and a highspeed bulk projector (5), and a rotary bucket wheel type bulk feeder (6) arranged on one side of said bulk projector, said bulk projector (5) including a bulk receiving chute (53) having bulk inlet mouth (530) opening toward the bulk charging port (63) of said bulk feeder, said vertical conveyor (2) being arranged in a substantially vertical space defined in a tubular casing frame and including two endless conveyor belts (2a, 2b) adapted to be driven upwardly in a substantially vertical direction in a face-to-face overlapping relation closely engaging each other along the opposite side edges thereof so as to serve the purpose of conveying bulk material as held between the opposing faces of the two conveyor belts vertically upward, said two conveyor belts being guided at the bulk-receiving bottom end so as to turn around in directions opposite to each other, said tubular casing frame including a vertical frame section and a lower frame section tiltably jointed thereto and being formed at the bottom end with an overhanging portion, said bulk projector (5) being carried on said overhanging portion of said tubular casing frame to serve to project bulk material rapidly under the effect of centrifugal force in an inclined upward direction to the bottom belt junction where the two endless conveyor belts come to join each other; a rotary boom type unloader (8) arranged for movement along a cargo handling place and including a luffing boom (82); and a unit support frame (79) mounted on said luffing boom at the free end thereof so as to be held at all times in a horizontal position and supporting said delivering unit (71) for vertical movement and rotation about the vertical axis thereof.

2. A vertical yard delivering system comprising: a delivering unit (71) in the form of a vertical bulk-delivering unit (71) including a vertical bulk-conveying apparatus comprised of an integral combination of a vertical conveyor (2) and a high speed bulk projector (5), and a rotary bucket wheel type bulk feeder (6) arranged on one side of said bulk projector, said bulk projector (5) including a bulk receiving chute (53) having bulk inlet mouth (530) opening toward the bulk charging port (63) of said bulk feeder, said vertical conveyor (2) being arranged in a substantially vertical space defined in a tubular casing frame and including two endless conveyor belts (2a, 2b) adapted to be driven upwardly in a substantially vertical direction in a face-to-face overlapping relation closely engaging each other along the opposite side edges thereof so as to serve the purpose of conveying bulk material as held between the opposing faces of the two conveyor belts vertically upward, said two conveyor belts being guided at the bulk-receiving bottom end so as to turn around in directions opposite to each other, said tubular casing frame including a vertical frame section and a lower frame section tiltably joined thereto and being formed at the bottom end with an overhanging portion, said bulk projector (5) being carried on said overhanging portion of said tubular casing frame to serve to project bulk material rapidly under the effect of centrifugal force in an inclined upward direction to the bottom belt junction where the two endless conveyor belts come to join each other; a delivering unit carrier including a traveling frame (72 or 75) arranged in straddling relation to a bulk storing yard made on a definite lot of ground as surrounded on its opposite side by a pair of carrier supporting rails ($R_1$, $R_2$, or $R_3$) laid parallel to each other on top of retaining walls (91, 92) or on the surrounding ground of said bulk storing yard ($Y_1$, $Y_2$, or $Y_3$) and comprised of a beam structure extending transversely thereof and supported at the opposite ends on respective leg structures (724, 725 or 753) arranged to travel along the opposite sides of the bulk storing yard and a unit support frame (73 or 76) movable along said beam structure and supporting said delivering unit (71) for vertical movement and rotation about the vertical axis thereof; and intermediate transfer means provided between the bulk discharging mouth (712) at the top of said delivering unit and a stationary conveyor arranged sidewise of the bulk storing yard in parallel thereto.

* * * * *